US006608646B1

(12) United States Patent
Lee

(10) Patent No.: US 6,608,646 B1
(45) Date of Patent: Aug. 19, 2003

(54) METHOD AND DEVICE FOR DETECTING AND CORRECTING A MALFUNCTION OF A HORIZONTAL/VERTICAL PROCESSOR USED IN AN IMAGE DISPLAY DEVICE

(75) Inventor: Ji-Young Lee, Anyang (KR)

(73) Assignee: Samsung Electronics Co., Ltd., Suwon (KR)

( * ) Notice: Subject to any disclaimer, the term of this patent is extended or adjusted under 35 U.S.C. 154(b) by 547 days.

(21) Appl. No.: 09/624,050

(22) Filed: Jul. 24, 2000

(30) Foreign Application Priority Data

Jul. 23, 1999 (KR) .......................... 1999-30046

(51) Int. Cl.[7] .................. H04N 17/00; H04N 3/24
(52) U.S. Cl. .................. 348/194; 348/180; 348/500
(58) Field of Search .................. 348/180, 181, 348/187, 189, 194, 466, 500, 607; 702/85, 89, 90, 108; 324/601; 714/703, 704, 707, 798; H04N 3/24, 17/00, 17/02

(56) References Cited

U.S. PATENT DOCUMENTS 6,246,554 B1 * 6/2001 Lee ........................... 348/607

* cited by examiner

Primary Examiner—Sherrie Hsia
(74) Attorney, Agent, or Firm—Robert E. Bushnell, Esq.

(57) ABSTRACT

A method for detecting and correcting an error of a device in which a malfunction of a horizontal/vertical processor used in an image display device is detected and corrected. A microcomputer initializes the horizontal/vertical processor, determines whether the horizontal/vertical processor is activated, sets an error check state for a malfunction check of the horizontal/vertical processor if the horizontal/vertical processor is activated, checks whether the horizontal/vertical processor has malfunctioned, and returns to the initialization step if the horizontal/vertical processor has malfunctioned. Accordingly, a malfunctioning horizontal/vertical processor can be rapidly converted to a normal operation state, and a damage to a product occurring due to the malfunction is prevented in advance to stabilize the quality of the product.

17 Claims, 6 Drawing Sheets

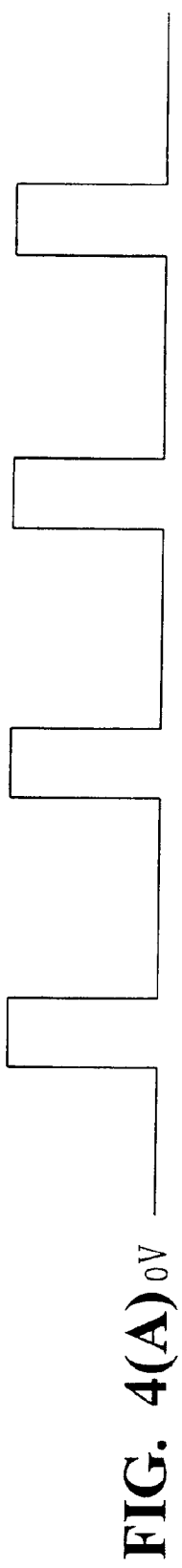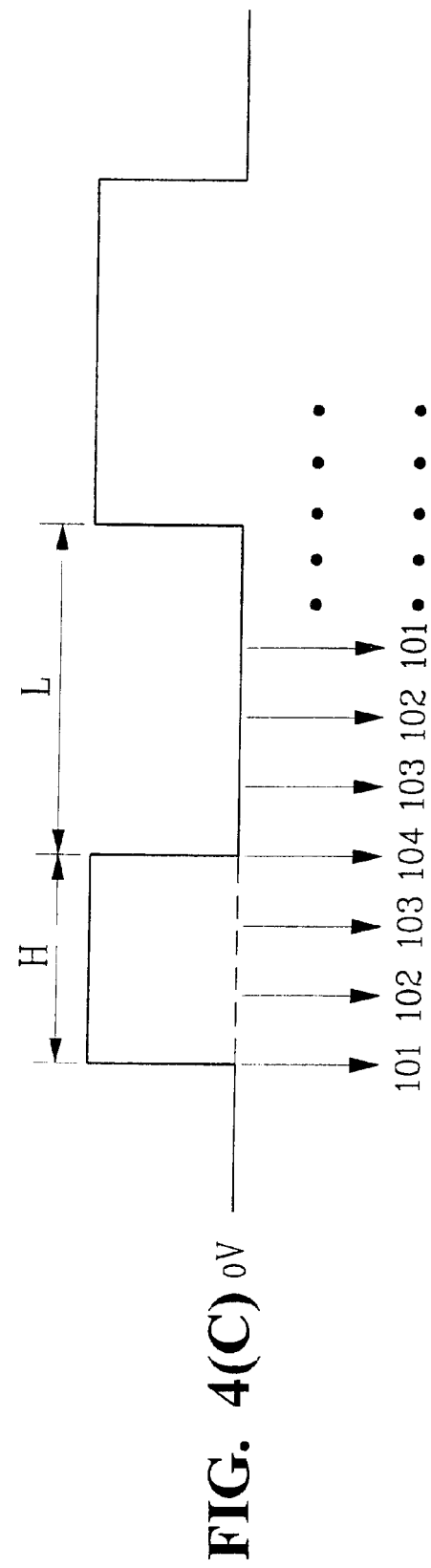
FIG. 4(A)
FIG. 4(B)
FIG. 4(C)

METHOD AND DEVICE FOR DETECTING AND CORRECTING A MALFUNCTION OF A HORIZONTAL/VERTICAL PROCESSOR USED IN AN IMAGE DISPLAY DEVICE

CLAIM OF PRIORITY

This application makes reference to, incorporates the same herein, and claims all benefits accruing under 35 U.S.C §119 from an application entitled Method And Apparatus For Detecting And Repairing An Error Of A Device earlier filed in the Korean Industrial Property Office on Jul. 23, 1999, and there duly assigned Serial No. 99-30046 by that Office.

BACKGROUND OF THE INVENTION

1. Field of the Invention

The present invention relates to a method and an apparatus for detecting a malfunction of a horizontal/vertical processor used in an image display device and correcting the detected malfunction of the horizontal/vertical processor.

2. Background of the Invention

In general, a horizontal/vertical processor for deflecting an electron beam in an image display device is normally operated with an electric power supply over 8 volts. Accordingly, if the electric power supply becomes unstable due to an electrostatic voltage or a surge voltage, the horizontal/vertical processor may be reset for register values to be converted to default states.

Therefore, normal signals from the horizontal/vertical processor are not output properly and damage to a product may occur.

SUMMARY OF THE INVENTION

In order to solve the above problem, it is an object of the present invention to provide a method for detecting a malfunction of a horizontal/vertical processor used in an image display device and correcting the detected malfunction.

It is another object of the present invention to provide an apparatus for detecting a malfunction of a horizontal/vertical processor used in an image display device and correcting the detected malfunction.

In order to achieve the above objects, a method for detecting and correcting a malfunction of a horizontal/vertical processor comprises steps of (i) initializing the processor; (ii) determining whether the processor is activated; (iii) setting an error, check state for a malfunction check of the processor if the processor is activated; (iv) checking whether the processor has malfunctioned; (v) returning to step (iii) if the processor is normally activated; and (vi), returning to step (i) if the processor has malfunctioned.

In order to achieve the above objects, an apparatus for detecting and correcting a malfunction of a horizontal/vertical processor operated in response to a clock signal and a data signal from an external host, and for outputting a vertical blanking signal in response to a vertical synchronization signal from the external host; a signal generation part inputting an electric power, and for outputting the electric power as a vertical blanking signal for an error detection in response to the vertical blanking signal; and a microcomputer for checking whether the vertical blanking signal for an error detection is generated based on a predetermined first check reference time period, comparing the vertical blanking signal for an error detection with a predetermined reference level, variably counting the vertical blanking signal for an error detection during the second check reference time period based on a result of the comparison, and initializing the horizontal/vertical processor or checking whether the vertical blanking signal for an error detection is generated based on whether the counted value of the vertical blanking signal for an error detection is larger than a predetermined reference counting value.

According to the present invention, the microcomputer frequently compares a vertical blanking signal generated from a device with a vertical blanking signal generated when the device is normally operated according to a predetermined time, to thereby detect whether the device has malfunctioned. Accordingly, a malfunctioning horizontal/vertical processor can be rapidly converted to a normal operation state, and damage to a product occurring due to the malfunction is prevented in advance.

BRIEF DESCRIPTION OF THE DRAWINGS

The above objects and other advantages of the present invention will become more apparent by describing in detail a preferred embodiment thereof with reference to the attached drawings, in which:

FIGS. 4(A)–4(C) are timing charts for explaining a method for detecting and correcting an error of a horizontal/vertical processor according to an embodiment of the present invention;

DETAILED DESCRIPTION OF THE PREFERRED EMBODIMENTS

Figure 1:
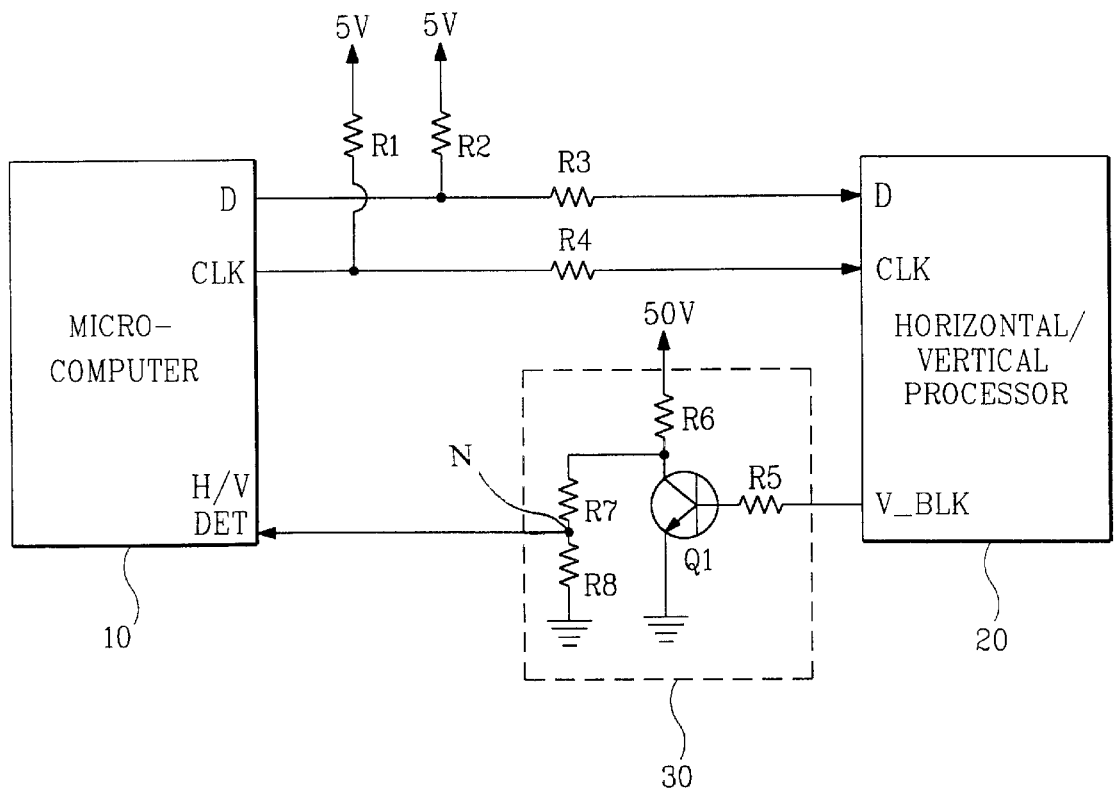
FIG. 1 is a circuit for showing a structure of an apparatus for detecting and correcting an error of a horizontal/vertical processor according to an embodiment of the present invention.

FIG. 1 is a circuit for showing a structure of an apparatus for detecting and correcting an error of a device according to an embodiment of the present invention. As shown in FIG. 1, the apparatus for detecting and correcting an error of a device has a horizontal/vertical processor 20 for outputting a vertical blanking signal V_BLK, a signal generator 30 for outputting a vertical blanking signal for an error detection V_BLK in response,to a vertical blanking signal, a microcomputer 10 for checking whether the vertical blanking signal for an error detection V_BLK is output based on a predetermined first check reference time period, variably counting a vertical blanking time of the vertical blanking signal for an error detection V_BLK for a predetermined second check reference time period based on a comparison result of a predetermined reference level and the vertical blanking signal for an error detection V_BLK, and initializing the horizontal/vertical processor 20 based on whether a counted value of the vertical blanking time for an error detection V_BLK is larger than a predetermined counting value or checking whether the vertical blanking, signal for an error detection V_BLK is generated, a first resistor R1, a second resistor R2, a third resistor R3, and fourth resistor R4.

At this time, the signal generator 30 has a fifth resistor R5 at a first input for receiving the vertical blanking signal for an error detection V_BLK; a sixth resistor R6 at another input for inputting a certain level of a received 50V electric power voltage; a transistor Q1 having a base electrode connected to receive the vertical blanking signal for an error detection V_BLK from the fifth resistor R5, an emitter electrode connected to ground, and a collector electrode connected to receive the voltage of a certain level from the sixth resistor R6; a-seventh resistor R7 one end of which is connected to the collector electrode and the other end of which is connected to a node N; and a eighth resistor R8 one end of which is connected node N and the other end of which is connected to ground.

Here, if a level of the vertical blanking signal for an error detection V_BLK is identical to a predetermined reference level, the microcomputer 10 increases by the reference counting value and counts the counted value of the vertical blanking time of the vertical blanking signal for an error detection V_BLK.

Further, if the level of the vertical blanking signal for an error detection V_BLK is not identical to the predetermined reference level, the microcomputer 10 decreases by the reference counting value and counts the counted value of the vertical blanking time of the vertical blanking signal for an error detection V_BLK.

Here, the first and the second check reference time period is 1 ms and 100 ms, respectively, and the reference level is a high level having a value larger than 0 volt, and the reference counting value is 1.

Hereinafter, operations of an apparatus for detecting and correcting an error of a device will be-described in detail with reference to FIGS. 1 to 4.

First, if the horizontal/vertical processor 20 is activated due to a clock signal CLK and a data signal D being received from the microcomputer 10, a vertical blanking signal V_BLK is output from the horizontal/vertical processor 20, as shown in FIG. 4(A).

When the transistor Q1 is turned off during a low-level interval of the vertical blanking signal for an error detection V_BLK, the voltage of 50V applied to the signal generator 30 is divided voltage to a certain level, and applied to a horizontal/vertical detection port H/V DET of the microcomputer 10 through the sixth and seventh resistors R6 and R7 as the vertical blanking signal for an error detection.

When the transistor Q1 is turned on during a high-level interval of the vertical blanking signal, the voltage of 50V applied to the signal generator 30 is applied to the ground through the sixth resistor R6 and the emitter electrode of the transistor Q1. Accordingly, a low level signal is applied to the horizontal/vertical detection port of the microcomputer 10.

Next, the microcomputer 10 counts the vertical blanking time of the vertical blanking signal for an error detection by unit of 1 ms, as shown in FIG. 4(C). At this time, the count by microcomputer 10 is increased by 1, from a predetermined value, to obtain a counted value of the vertical blanking time during the high-level interval of the vertical blanking signal for an error detection. Then, during the low-level interval of the vertical blanking signal, the count by microcomputer 10 is decreased by 1 from the counted value reached during the high-level interval of the vertical blanking time, for an error detection. The microcomputer 10 continues to decrease the counted value of the vertical blanking time of the vertical blanking signal for an error detection by 1 until the high-level vertical blanking signal for an error detection V_BLK is again generated. If the high-level-vertical blanking signal for an error detection V_BLK is not generated again, or if the vertical blanking signal for an error detection V_BLK is not generated as shown in FIG. 4(B), due to an apparent malfunction of the horizontal/vertical processor 10, the counted value of the vertical blanking time will continue to count down until it reaches "1". At this time the microcomputer 10 determines that the horizontal/vertical processor 20 has malfunctioned, and resets the horizontal/vertical processor 20 to be re-activated.

Now, a method for detecting and correcting an error of a device according to an embodiment of the present invention will be described with reference to FIGS. 2 to 4.

Figure 2:
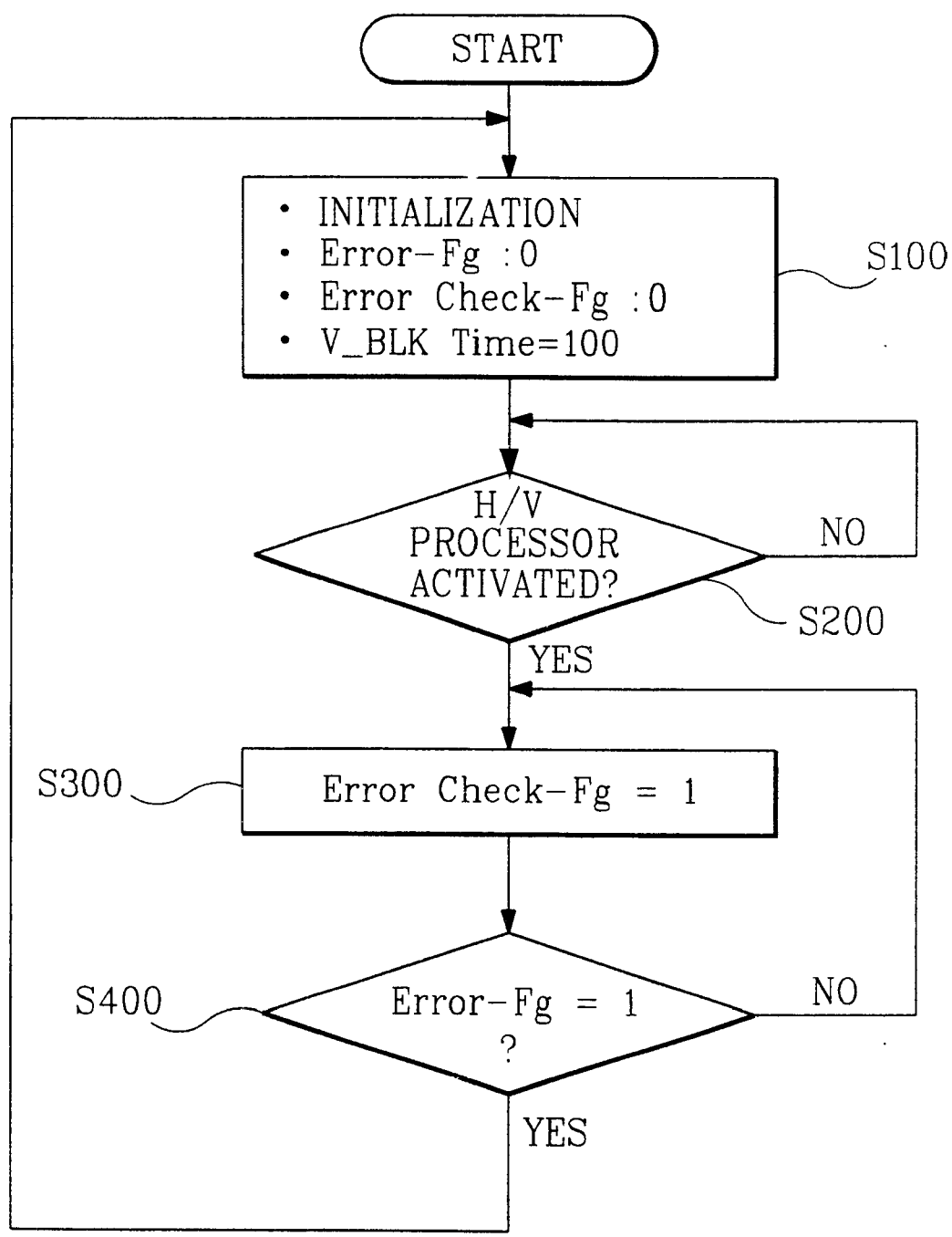
FIGS. 2 and 3 are flow charts for explaining a method for detecting and correcting an error of a horizontal/vertical processor according to an embodiment of the present invention.
Figure 3:
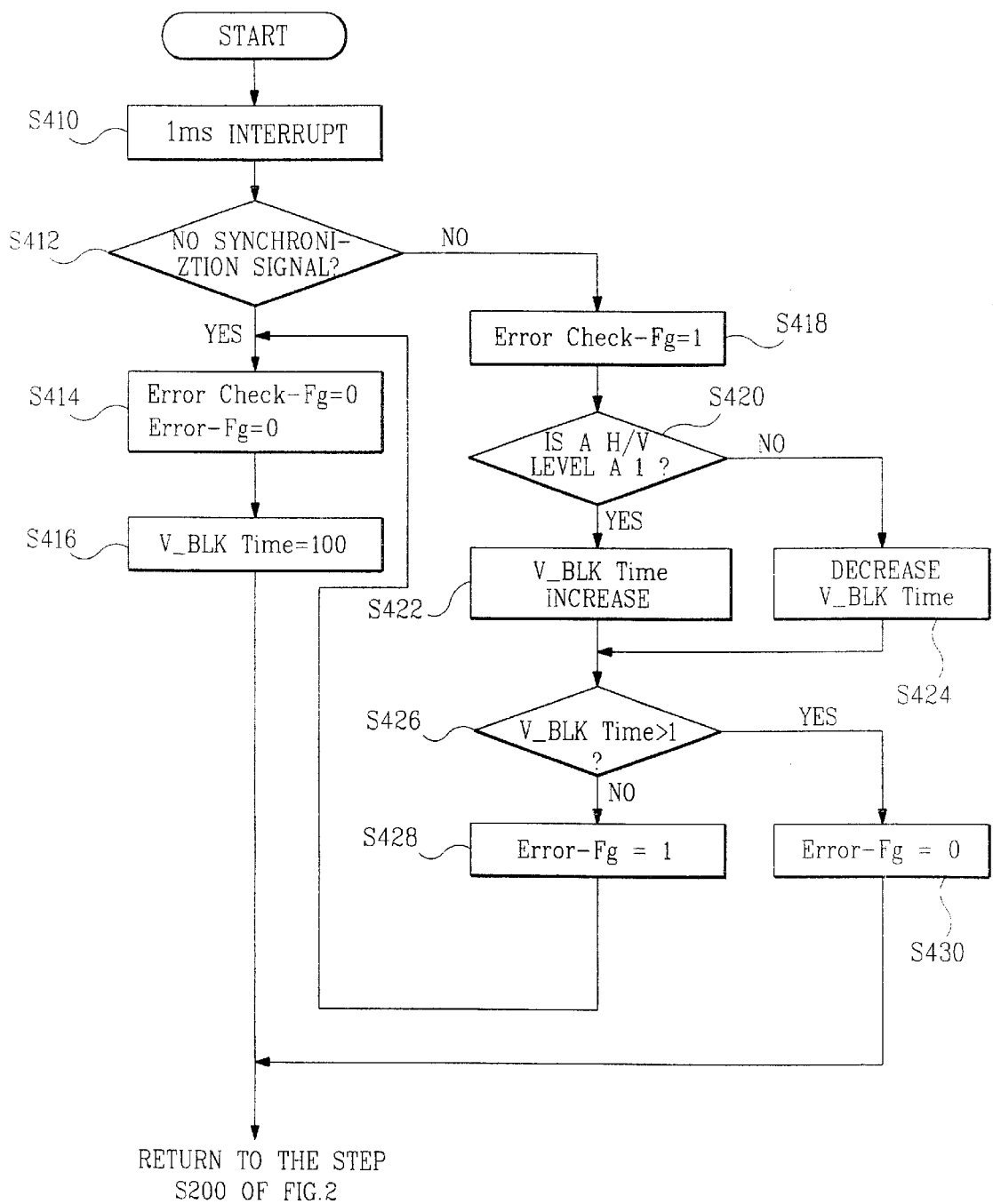

FIG. 2 and FIG. 3 are flow charts for explaining a method for detecting and correcting an error of a device according to an embodiment of the present invention, and FIG. 4 is a timing diagram for explaining a method for detecting and correcting an error of a device according to an embodiment of the present invention.

As shown in FIG. 2, the microcomputer 10 initializes the horizontal/vertical processor 20 (step S100). That is, when the microcomputer 10 initializes the horizontal/vertical processor 20, an error flag Error-Fg is set to "0", an error check flag Error Check-Fg is set to "0", and a vertical blanking time V_BLK Time is set to "100".

Next, the microcomputer 10 determines whether or not the horizontal/vertical processor 20 is activated (S200), and, when it is determined that the horizontal/vertical processor 20 is not activated, the microcomputer 10 returns to the step 200. That is, microcomputer 10 continues in a state of checking for activation of the horizontal/vertical processor 20 by looking for an input signal, i.e., the vertical blanking signal for an error detection V_BLK, at the H/V DET terminal, and when it is determined that the horizontal/vertical processor 20 is activated, the microcomputer 10 operates in an error check state looking for a malfunction of the horizontal/vertical processor 20 (steps S300 and 400).

In step 300, microcomputer 10 sets the error check flag Error Check-Fg to "1", and in step S400 checks the error flag Error-Fg to determine-whether it has been set to "1". If the horizontal/vertical processor 20 has not malfunctioned, the microcomputer 10 returns to the step S300. When it is determined that the horizontal/vertical processor 20 has malfunctioned, the microcomputer 10 returns to the step S100. That is, when the error flag Error-Fg is determined to be set "1", the horizontal/vertical processor 20 is determined to have malfunctioned, and the microcomputer 10 returns to the step S100.

Now the method for detecting and correcting an error of a device, i.e. horizontal/vertical processor 20 will be further explained with respect to FIG. 3, which is a view showing the error detection routine at a portion within steps S100 to S400 shown in FIG. 2 if a 1 ms interrupt signal is input.

Microcomputer 10 sets the first check reference time, that is, a 1 ms interrupt, in order to determine if the vertical blanking signal for an error detection V_BLK is generated (step S410). Next, as shown in FIG. 4(C), the microcomputer 10 counts the vertical blanking time of the vertical blanking signal for an error detection V_BLK every 1 ms interrupt to determine if the vertical blanking signal for an error detection is generated V_BLK (Step S412).

If the vertical blanking signal for an error detection V_BLK is not generated, the microcomputer 10 determines that the horizontal/vertical processor 20 is not activated. Accordingly, the microcomputer 10 sets the error check flag ErrorCheck-Fg and the error-flag Error-Fg to "0". (Step S414), and sets the vertical blanking time V_BLK Time to "100" (Step S416). Steps S414 and S416 cause the horizontal/vertical processor 20 to be reset at which time the routine returns to step S200 of FIG. 2.

If it has been determined, at step S412, the vertical blanking signal for an error detection V_BLK was generated. The microcomputer 10 sets the error check flag ErrorCheck-Fg to "1" an error check state for a malfunction check of the horizontal/vertical processor 20 (Step S418). The microcomputer 10 then determines if a present level of the vertical blanking signal for an error detection V_BLK received at the H/V DET terminal via signal generator 30 is identical to a predetermined reference level (Step S420). At this time, the predetermined reference level means a logic "1", that is, a high level.

If the present level of the vertical blanking signal for an error detection is identical to the high level, that is, the predetermined reference level, the microcomputer 10 increases a count by "1" (Step S422) and counts the counted value of the vertical blanking time of the vertical blanking signal for an error detection, as in a high-level interval H as shown in FIG. 4(C). That is, microcomputer 10 increases the vertical blanking time V_BLK Time by increments of 1 when it is determined that the signal received at terminal H/V DET has a predetermined logic value.

Reversely, if the present level of the vertical blanking signal for an error detection is not identical to the predetermined reference level, the microcomputer 10 decreases the count by "1" (Step S424) and counts the counted value of the vertical blanking time of the vertical blanking signal for an error detection as in a low-level interval L shown in FIG. 4(C). That is, microcomputer 10 decreases the vertical blanking time V_BLK Time by increments of 1 when it is determined that the signal received at terminal H/V DET is below the predetermined logic value.

The counting operations of the vertical blanking time of the vertical blanking signal for an error detection in the microcomputer 10 continues to be performed during the activation of the horizontal/vertical processor 20.

Next, the microcomputer 10 determines whether the count value of the vertical blanking time V_BLK Time is larger than a reference counting value (Step S426). At this time, the reference counting value is "1". That is, the microcomputer 10 determines that the horizontal/vertical processor 20 has not malfunctioned when the counted value of the vertical blanking time V_BLK Time is greater than "1". When it is determined that the counted value of the vertical blanking time V_BLK Time is greater than "1", then the error flag Error-Fg is set to "0" (step S430) and the routine returns to step S200 of FIG. 2.

Reversely, when it is determined the counted value of the vertical blanking time V_BLK Time is not larger than the reference counting value of "1", microcomputer 10 determines that the horizontal/vertical processor 20 has malfunctioned and the error flag Error-Fg is set to "1" (step S428). At this time the routine performs steps S414 and S416 to reset the horizontal/vertical processor 20 and then the routine returns to step S200 of FIG. 2.

In accordance with a method and an apparatus for detecting and correcting an error of a device as stated above, the microcomputer frequently compares a vertical blanking signal generated from a device with a vertical blanking signal generated when the device is normally operated according to a predetermined time, to thereby detect whether the device has malfunctioned.

Figure 5:
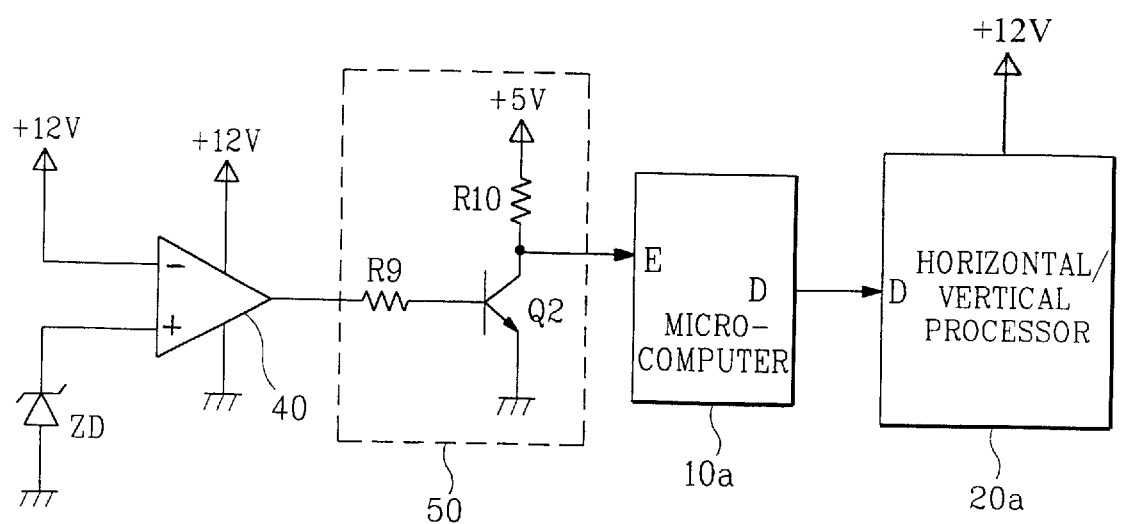
FIG. 5 is a circuit for showing a structure of an apparatus for detecting and correcting an error of a horizontal/vertical processor according to another embodiment of the present invention.

As stated above, it is the object of the embodiment of the present invention to detect a malfunction of the horizontal/vertical processor 20 using a vertical blanking signal output from the horizontal/vertical processor 20 and to correct the malfunction. FIG. 5 is a circuit for showing a structure of an apparatus for detecting and correcting an error of a device according to another embodiment of the present invention, wherein a microcomputer 10a checks a voltage level of electric power supply lines of 12V to determine whether a horizontal/vertical processor 20a has malfunctioned. As shown in FIG. 5, a switching drive signal generator 40 outputs a switching drive signal by comparing a voltage level 12V of the electric power line with a reference voltage produced by the zener diode ZD, a negative terminal of the switching drive signal generator 40 being connected to the 12V electric power line, and a positive terminal of the switching drive signal being connected to the zener diode ZD, and an error detection signal generator 50 for outputting a high-level or a low-level error detection signal based on the switching drive signal of the switching drive signal generator 40.

Microcomputer 10a initializes the horizontal/vertical processor 20a in response to the error detection signal and also checks whether the error detection signal is generated. An operational amplifier of the he switching drive signal generator 40 and the horizontal/vertical processor 20a operate in response to an applied voltage of 12 volts and both are reset when the applied voltage drops to 8 volts or less. When such a voltage drop occurs horizontal/vertical processor 20a malfunctions and it becomes necessary for microcomputer 10 to initialize the horizontal/vertical processor 20a to correct the malfunction.

The error detection signal generator 50 has a resistor R9 for inputting the switching drive signal through an input terminal thereof; a resistor R10 connected to an electric power of 5V for inputting a certain level through one end thereof, a transistor Q2 having a base electrode connected to the other end of resistor R9, an emitter electrode connected to ground, a collector electrode connected to the other end of resistor R10; and an output terminal connected to the collector electrode.

Figures 6A, 6B, 6C:
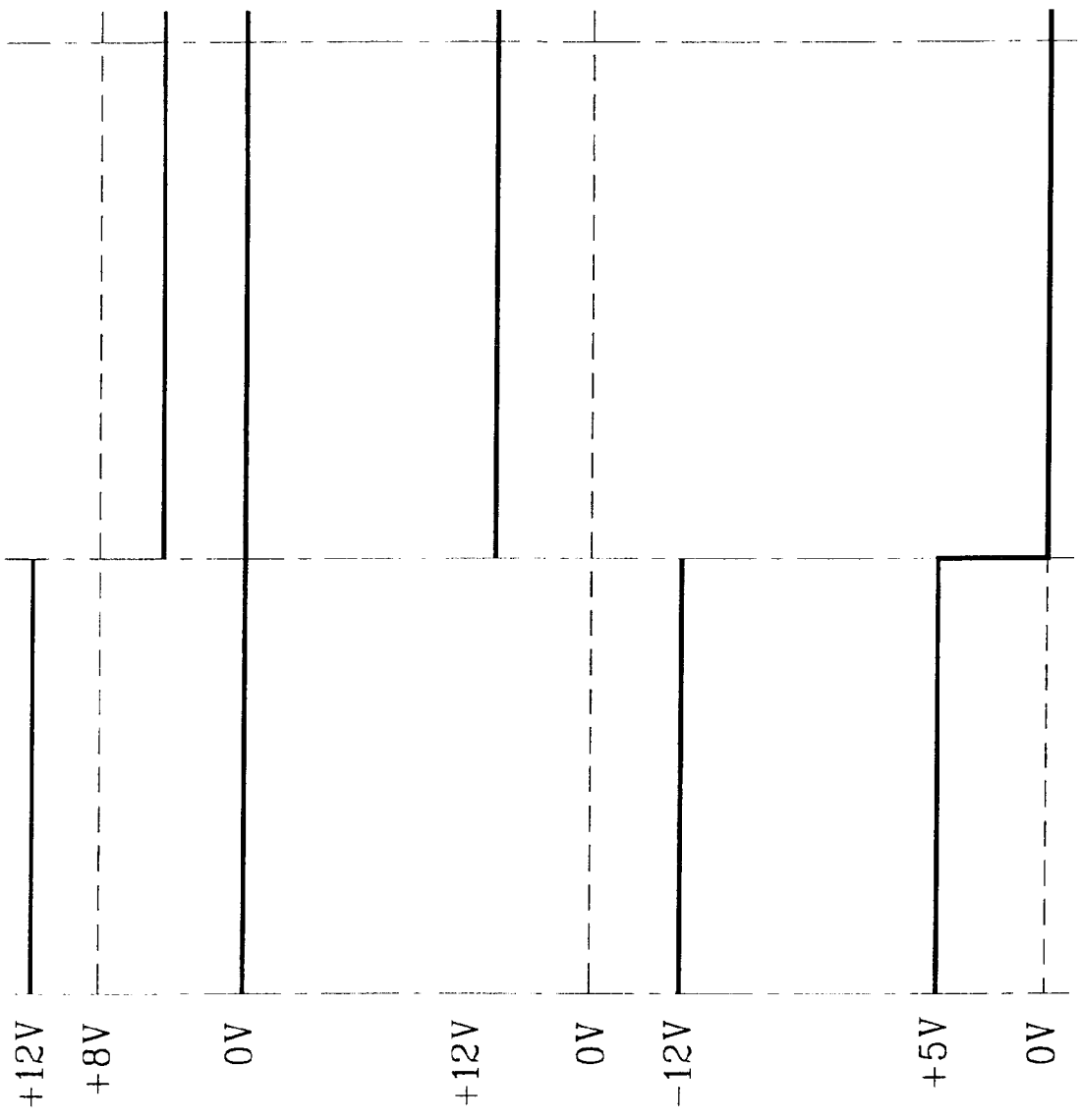
FIGS. 6(A)–6(C) illustrate waveform views for respective parts of FIG. 5.

The embodiment of the present invention having the structure as mentioned above and shown in FIG. 5, will now be further explained with respect to FIGS. 6(A)–6(C) when a positive 12V voltage level of the electric power line is connected to the negative terminal of signal generator 40 as shown in FIG. 6(A), a negative 12V is supplied to the output terminal of signal generator 40 as shown in FIG. 6(B). Therefore, the switching device that is the transistor Q2 is in an off state, and a high-level error detection signal, as shown in FIG. 6(C), is input to a terminal E of microcomputer 10a through the resistor R10. When microcomputer 10a receives a high-level error detection signal at terminal E, the horizontal/vertical processor 20a is determined to be operating normally.

When a voltage level of the electric power line connected to the negative terminal of the signal generator 40 drops under an 8V, as shown in FIG. 6(A), a positive voltage of 12V, as shown in FIG. 6(B), is supplied to the input terminal of signal generator 40 to be dropped by resistor R9 to a drive voltage transistor Q2. Therefore, transistor Q2 is turned on by the drive voltage provided through resistor R9, so that the electric power of 5V is no longer applied to the microcomputer 10a but instead flows to the ground through resistor R10 and the emitter electrode of the transistor Q2. Accordingly, a low-level error detection signal, as.shown in FIG. 6(C) is input to terminal E of microcomputer 10, and the microcomputer 10a recognizes that the horizontal/vertical processor 20a is in an malfunction state. Microcomputer 10a then initializes the horizontal/vertical processor 20a to return its performance to a normal operation state.

Accordingly, a device in a malfunction can be rapidly converted to a normal operation state, and a damage to a product occurring due to the malfunction is prevented in advance to stabilize the quality of the product.

Although the preferred embodiments of the present invention has been described, it will be understood by those skilled in the art that the present invention should not be limited to the described preferred embodiments, but various changes and modifications can be made within the spirit and scope of the present invention as defined by the appended claims.

What is claimed is:

1. A method for detecting and correcting an error of a device, comprising steps of:

initializing the device; determining whether the device is activated;

setting an error check state for a malfunction check of the device if the device is activated;

checking whether the device is of malfunction;

returning to the step of setting an error check state if the device is normally activated; and returning to the initializing step if the device is of malfunction.

2. The method as claimed in claim 1, wherein the step of returning to the initializing step if the device is of malfunction includes steps of determining whether a synchronization signal is generated from the device based on a predetermined first check reference time;

returning to the step of determining whether a synchronization signal is generated if the synchronization signal is not generated;

variably counting a vertical blanking time during a predetermined second check reference time based on whether a level of the synchronization signal is a predetermined reference level, if the synchronization signal is generated;

determining whether a counted value of the vertical blanking time is larger than a predetermined reference counting value;

returning to the step of determining whether a synchronization signal is generated if the counted value is larger than the reference counting value; and returning to the initializing step if the counted value is not larger than a reference counting value.

3. The method as claimed in claim 2, wherein the step of variably counting a vertical blanking time includes steps of:

determining whether a level of the synchronization signal is identical to a predetermined reference level;

increasing a count value of the vertical blanking time by the reference counting value if the level of the synchronizations signal is identical to the reference level; and decreasing the count value of the vertical blanking time by the reference counting value if the level of the synchronization signal is not identical to the reference level.

4. The method as claimed in claim 3, wherein the first and the second check reference time is 1 ms and 100 ms, respectively.

5. The method as claimed in claim 3, wherein the reference level is a high level having a larger value than 0V.

6. The method as claimed in claim 3, wherein the reference counting value is 1.

7. An apparatus for detecting and correcting an error of a device, comprising:

a horizontal/vertical processor operated in response to a received clock signal and a received data signal, and outputting a vertical blanking signal in response to an external vertical synchronization signal;

a signal generation part inputting an applied electric power, and outputting the electric power as a vertical blanking signal for an error detection in response to the vertical blanking signal; and a microcomputer for checking whether the vertical blanking signal for an error detection is generated based on a predetermined first check reference time period, comparing the vertical blanking signal for an error detection with a predetermined reference level, performing a counting operation in response to the vertical blanking signal for an error detection during a second check reference time period based on a result of the comparison, and performing one of initializing the horizontal/vertical processor and checking whether the vertical blanking signal for an error detection is generated based on whether the counted value of the vertical blanking signal for an error detection is larger than a predetermined reference counting value.

8. The apparatus as claimed in claim 7, wherein the signal generation part includes:

a transistor having a base electrode, a collector electrode, and an emitter electrode connected to a ground terminal;

a first resistor connected between the base electrode and said horizontal/vertical processor for inputting said vertical blanking signal;

a second resistor connected between said collector electrode and a source of said electric power for inputting a certain level of said electric power;

a third resistor connected between the collector electrode and a node; and a fourth resistor connected between said node and said ground terminal, said node being further connected to said microcomputer for providing said vertical blanking signal for an error detection to said microcomputer.

9. The apparatus as claimed in claim 7, wherein said counting operation by said microcomputer counts up from a predetermined count value a predetermined incremental step when said comparison, result indicates a level of the vertical blanking signal for an error detection is identical to the predetermined reference level.

10. The apparatus as claimed in claim 7, wherein said counting operation by said microcomputer counts down from a predetermined count value a predetermined decremental step when said comparison result indicates a level of the vertical blanking signal for an error detection is less than the predetermined reference level.

11. The apparatus as claimed in claim 7, wherein the first and the second check reference time period are 1 ms and 100 ms, respectively.

12. The apparatus as claimed in claim 7, wherein the reference level is a high level having a value larger than 0V.

13. The apparatus as claimed in claim 7, wherein the predetermined reference counting value is 1.

14. An apparatus for detecting and correcting an error of a device, comprising:
- a horizontal/vertical processor operated with an input of a drive electric power of a certain level;
- a switching drive signal generation part for generating a switching drive signal by comparing a voltage level of the drive electric power of the horizontal/vertical processor with a reference voltage level;
- an error detection signal generation part for generating an error detection signal while selectively driven based on a switching drive signal output from the switching drive signal generation part; and
- a microcomputer for initializing the horizontal/vertical processor based on the error detection signal of the error detection signal generation part.

15. The apparatus as claimed in claim 14, wherein the error detection signal generation part includes:
- a transistor having a base electrode, a collector electrode, and an emitter electrode connected to a ground terminal;
- a first resistor connected between said base electrode and said switching drive signal generation part for inputting the switching drive signal;
- a second resistor connected between said collector electrode and a voltage source, said collector electrode being further connected to provide said error detection signal to said microcomputer.

16. The apparatus as claimed in claim 14, wherein the switching drive signal generation part comprises:
- an operational amplifier having a negative terminal connected to said drive electric power; and
- a zener diode connected between a positive terminal of said operational amplifier and a ground terminal for applying said reference voltage level to said positive terminal.

17. The apparatus as claimed in claim 16, wherein the certain level of said drive electric power is 12 volts and the reference voltage level is 8 volts.

* * * * *